No. 697,192. Patented Apr. 8, 1902.
R. E. BALL.
METHOD OF CHARGING ACCUMULATORS.
(Application filed July 1, 1901.)
(No Model.) 2 Sheets—Sheet 1.

Witnesses
W. A. Alexander
J. R. Watkins

Inventor
Royal E. Ball
By Attorneys
Fowler & Bayoud

UNITED STATES PATENT OFFICE.

ROYAL EDWARD BALL, OF NEW YORK, N. Y.

METHOD OF CHARGING ACCUMULATORS.

SPECIFICATION forming part of Letters Patent No. 697,192, dated April 8, 1902.

Application filed July 1, 1901. Serial No. 66,640. (No model.)

*To all whom it may concern:*

Be it known that I, ROYAL EDWARD BALL, a citizen of the United States, residing at the city of New York, in the county and State of New York, have invented a certain new and useful Method of Charging Accumulators, of which the following is such a full, clear, and exact description as will enable any one skilled in the art to which it appertains to make and use the same, reference being had to the accompanying drawings, forming part of this specification.

My invention relates more particularly to a method of charging accumulators by means of alternating current; and it consists in part in varying the resistance of the accumulator to be charged with the variations in electromotive force of the charging-current. This I may accomplish by suitably varying the number of cells in circuit with the variations in tension of the charging-current. For the purpose of so varying the number of cells in circuit automatically and in suitable proportion I have invented the apparatus described below in connection with the description of my method. This apparatus forms the subject of another application for patent filed by me of even date with this one.

The object of my invention is to impart to the units or cells composing an accumulator or storage battery, by means of alternating or pulsating currents, a substantially uniform charge.

Figure 1:
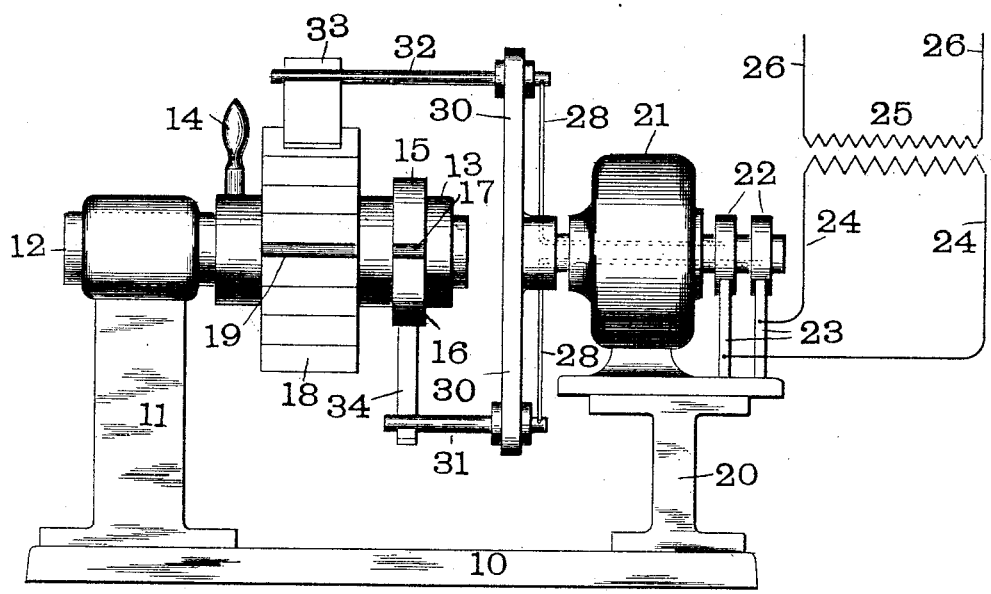
Figure 2:
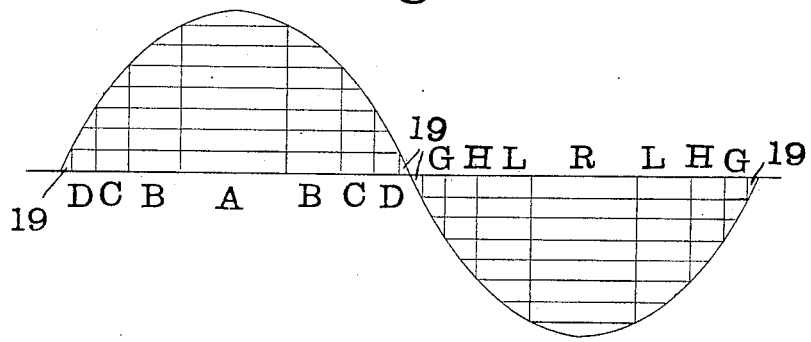
Figure 3:
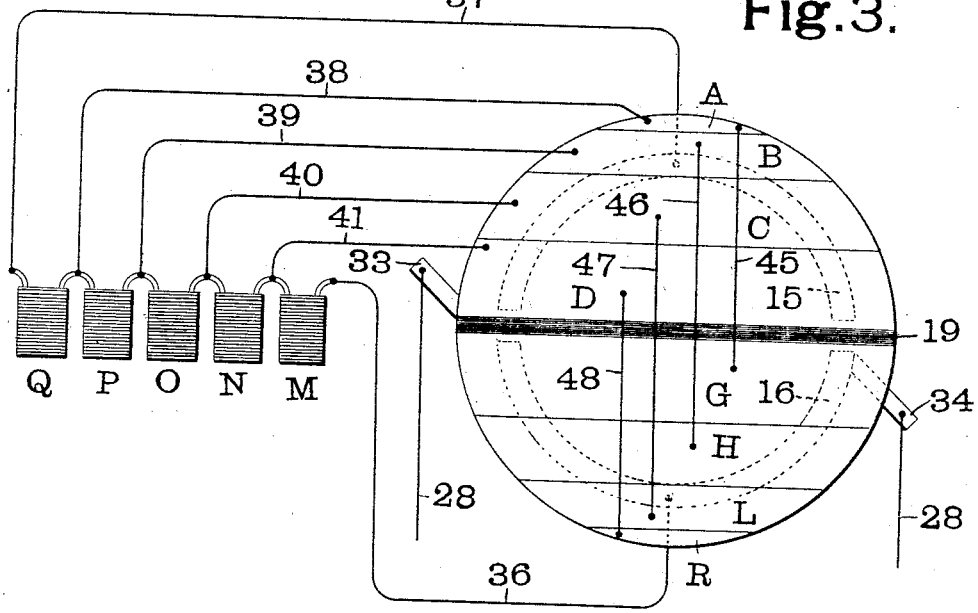
Figure 4:
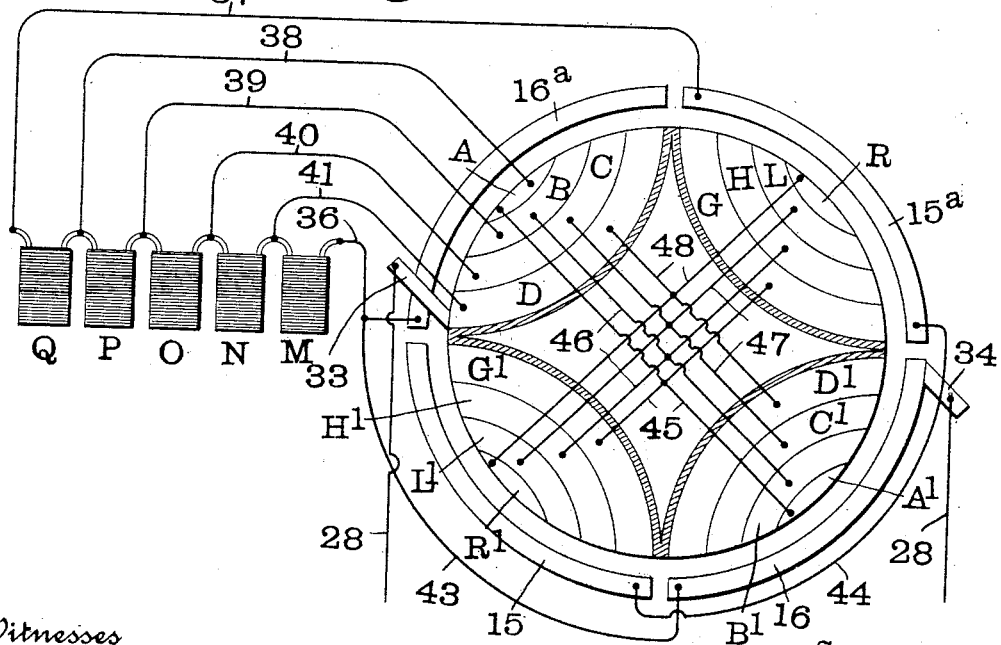

In the drawings, in which like characters of reference refer to similar parts in the different views, Figure 1 is a side view of an apparatus suitable for carrying out my method. Fig. 2 is a diagram which will be found useful in explaining my method. Fig. 3 is a diagram of a peculiar form of commutator forming part of the apparatus shown in Fig. 1, and Fig. 4 is a diagram of a modification of the commutator shown in diagram in Fig. 3.

In carrying out my process I commutate the cells of the storage battery by a peculiar commutator, so that the number of cells in circuit is at any period in direct proportion to the electromotive force of the wave of alternating-current supply. Thus, for example, while the electromotive force of the charging-alternating-current wave is less than two volts, and when if any of the battery units were in circuit they would tend to discharge themselves through the circuit instead of being charged by the current flowing therein, none of the cells are in circuit. When the charging-current attains between two and five volts, one cell is in circuit, when between five and eight volts are attained two cells are in circuit, when between eight and eleven volts are attained three cells are in circuit, and so on progressively upward to the crest of the alternating wave, whence the number of cells in circuit is progressively reduced in proportion to the now-falling electromotive force until the point of no electromotive force is reached, when, by a reversal of connections, the progressive cutting in and out of coils is repeated on the negative wave of current.

It will be noticed from the above that I recommend a charging electromotive force per cell somewhat higher than it is customary to use in constant-electromotive-force practice. The reason for this is, as will be understood later, that by my method each of the cells that constitute the battery is in circuit but one-half of the time, and therefore can receive during such period a rate of charge higher than is customarily employed.

Referring first to Fig. 1 of the drawings, 10 is a base at one end of which is situated the standard 11, from which projects horizontally the stud 12, having upon it the sleeve 13, preferably composed of insulating material and carrying a handle 14 for purposes of adjustment. This sleeve 13 carries an ordinary reversing-commutator composed of the conducting-segments 15 and 16, separated electrically from each other by diametrically opposite insulating-segments 17. Upon this insulating-sleeve 13 is also carried a second commutator 18, of a peculiar construction, to be hereinafter described. This commutator 18 is divided into two main portions by the insulating-segments 19, placed at diametrically opposite points thereof. The opposite end of the base 10 carries upon a standard 20 a synchronous motor 21 of any ordinary construction. Upon the collecting-rings 22, situated upon the shaft of this motor, bear brushes 23, to which are attached the secondary mains 24 of an alternating-current circuit which includes a transformer 25, the primary mains of which are shown at 26. From the collecting-rings 22 lead the conductors 28, which pass through horizontal arms 31 and 32, carried at opposite extremities of arms 30, keyed upon the opposite end of the motor-shaft to that upon which the contact-rings 22 are situated. The arms 32 and 31 carry, respectively, brushes 33 and 34, which bear upon the commutator 18 and the segments 15 and 16 of the reversing-commutator, respectively. Fig. 3 represents in diagram these two commutators and their connections. It will be seen that the commutator 18 is composed of two sets of chordal bars A B C D and G H L R. These bars are insulated from those adjacent to them, and between the two central bars D and G is situated the broad insulating-strip 19, above described, which divides the commutator into two parts, each of which composes approximately one-half of said commutator. The brush 33 is adapted to bear upon the segmental ends of these bars, and the brush 34 is adapted to bear upon the segments 15 and 16 of the reversing-commutator. As shown, each of the bars in one set of bars composing a part of the commutator 18 is cross-connected to a bar in the other set. Thus A is connected with G by means of the conductor 45, B with H by the conductor 46, C with L by the conductor 47, and D with R by the conductor 48. These cross connections are for the purpose of simplifying the apparatus and obviating the necessity of connecting each half of the commutator by separate conductors with the accumulator, as will be understood from the following description:

M N O P Q are cells composing the units of a storage battery or accumulator. The cell M has one of its elements connected by means of a conductor 36 to the segment 16 of the reversing-commutator, and the cell Q has one of its elements connected by means of a conductor 37 with the segment 15 of the reversing-commutator. The remaining elements of the cells M and Q and the elements of the cells N, O, and P are connected in series in the usual manner, and each couple so connected in series is electrically connected by means of one of the wires 38, 39, 40, and 41 with one of the bars A B C D composing a part of the commutator 18.

The operation of this apparatus in carrying out my method is as follows: Referring to Fig. 2, which shows a diagram of the electromotive force of an alternating-current wave and indicates the position of the brush 33 upon the segments of the commutator 18 at any moment during the rise and fall of such electromotive force, and, keeping in mind the diagram of Fig. 3, we will suppose that the brushes start in the position as shown in Fig. 3—that is, the brush 33 bearing upon the bar D and the brush 34 bearing upon the segment 16. The position of the brush 33 in Fig. 3 corresponds to the position D in the diagram of Fig. 2. It will now be seen that if alternating electric current flows to the brushes 33 and 34 a current will flow from the brush 33 through the conductor 41 to the cell M and after passing through said cell flows through the conductor 36 to the brush 34 by means of the reversing commutator-segment 16, as the brushes advance so as to bring the brush 33 into contact with bar C. It will be seen that we now have two cells, M and N, in circuit, and at the same time, by referring again to Fig. 2, it will be noticed that in position C the electromotive force of the current is approximately twice as great as in position D. Similarly by continuing to revolve the brushes in synchronism with the wave of alternating current the successive cells are cut into circuit as the electromotive force increases until we reach the apex of the electromotive force, corresponding to the position A in Fig. 2 and the bar A in Fig. 3. From this point on for a quarter-cycle the electromotive force of the positive wave is decreasing, and at the same time the cells are progressively cut out of circuit in proportion to the diminishing electromotive force by the passing of the brush 33 successively over the opposite ends of the bars B, C, and D until we reach the end of the bar D. Here it may be supposed that the electromotive force has dropped to two volts and that if the last cell were left in circuit it would begin to discharge itself. This is prevented, however, by the brush 33 coming in contact with the insulating-bar 19, which breaks the circuit during the time the electromotive force of the current is below the given limit. Thus all the cells are out of circuit until the electromotive force has fallen to two volts on the negative curve. At this point a change takes place, and the brush 34 now rests upon the segment 15 of the reversing-commutator, while the brush 33 has passed to the bar G on the commutator 18. This reverses the battery connections, so that the negative wave passes through the cells in the same direction as did the positive wave. The cells are now, however, switched into circuit progressively in the reverse order to that immediately above described—that is, the cell Q, which has not heretofore been in circuit, is the first to be cut in, and by the progressive movement of the brush 33 over the bars G, H, L, and R the cells P, O, and N are successively cut into circuit in the order named until the apex of the negative wave is reached, whence onward they are successively cut out of circuit in a manner similar to that above described in connection with the cutting in and out of the cells on the diminishing positive wave. It will thus be seen that the cell M was first in circuit constantly during one-half of a cycle and that it was then cut out of circuit and the cell Q cut into circuit during approximately the remaining half of the cycle. Thus the cells M and Q have been in circuit for approximately equal lengths of time and have received approximately equal charges. The same may be said of the cells N, O, and P, which have been cut into and out of circuit progressively, as above described. This will be understood from the following calculation. Disregarding the length of time required for the brush 33 to pass over the insulating-bar 19 and calling the times in which the brush is passing over the bars D, C, B, and ¼ A equal, we have the following, in which the first column represents the block the brush is upon and the second column represents the cells in circuit:

| | | | | |
|---|---|---|---|---|
| D..... M | | | | |
| C..... M | N | | | |
| B..... M | N | O | | |
| ¼ A... M | N | O | P | |
| ¼ A... M | N | O | P | |
| B..... M | N | O | | |
| C..... M | N | | | |
| D..... M | | | | |
| G..... | | | | Q |
| H..... | | | P | Q |
| L..... | | O | P | Q |
| ¼ R... | N | O | P | Q |
| ¼ R... | N | O | P | Q |
| L..... | | O | P | Q |
| H..... | | | P | Q |
| G..... | | | | Q |
| 8 | 8 | 8 | 8 | 8 |

It will thus be seen that during a complete cycle each cell is in circuit for the same length of time, and as the current is always in the same direction it follows that the cells must be uniformly charged.

Fig. 4 shows a modification of the commutator shown and described in connection with Fig. 3. It is necessary that in the apparatus shown and described in Fig. 3 the commutator-brushes should rotate completely once with every cycle of alternating current passed through the battery. In the majority of cases in practice this would be too high a speed, and therefore in Fig. 4 is shown a commutator by which the same results will be produced when the commutator-brushes rotate once for every two cycles of alternating current. This commutator, instead of having but one set of bars A B C D and G, H, L, and R, has two sets of bars A B C D and G H L R and A' B' C' D' and G' H' L' R' cross-connected with each other in substantially the same manner as shown in Fig. 3, and in correspondence with this duplication of parts of the commutator 18 the reversing commutator-segments 15 and 16 are also duplicated, as shown at 15ª and 16ª, the segments 15 and 15ª and segments 16 and 16ª being suitably connected with each other by means of the conductors 44 and 43, respectively. The position of the brushes 33 and 34 and the operation of this commutator is similar to that described in connection with the commutator shown in Fig. 3, with the exception that the brushes rotate but once around the commutator for each two cycles of alternating current supplied. It will be noticed that the method can be used for supplying continuous current for lighting and power, the storage battery in this case integrating and averaging the alternating current to a uniform electromotive force.

Having fully described my invention, what I claim as new, and desire to secure by Letters Patent of the United States, is—

1. The method of charging an accumulator composed of a plurality of units, which consists in passing through said accumulator a current the electromotive force of which rises and falls in a series of waves, varying the number of said units in circuit by cutting said units into and out of circuit in a predetermined order during the rise and fall of one of said waves, and then varying the number of said units in circuit by cutting said units into and out of circuit in an order reverse to said first-named order during the rise and fall of a succeeding wave.

2. The method of charging an accumulator composed of a plurality of units, which consists in passing through said accumulator a current the electromotive force of which rises and falls in a series of waves, varying the number of said units in circuit by cutting said units into and out of circuit in a predetermined order during the rise and fall of one of said waves, interrupting the flow of said current through said accumulator during the time when its electromotive force is less than the electromotive force of one of said units, and then varying the number of said units in circuit by cutting said units into and out of circuit in an order reverse to said first-named order during the rise and fall of the succeeding wave.

In testimony whereof I have hereunto set my hand and affixed my seal in the presence of the two subscribing witnesses.

ROYAL EDWARD BALL. [L. S.]

Witnesses:
 J. S. BELL,
 W. H. TAYLOR.